(12) United States Patent
Schneider et al.

(10) Patent No.: US 10,719,676 B2
(45) Date of Patent: Jul. 21, 2020

(54) CAMERA AND METHOD FOR FOCUS ADJUSTMENT

(71) Applicant: SICK AG, Waldkirch (DE)

(72) Inventors: Florian Schneider, Waldkirch (DE); Thomas Pfrengle, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/250,114

(22) Filed: Jan. 17, 2019

(65) Prior Publication Data

US 2019/0251312 A1   Aug. 15, 2019

(30) Foreign Application Priority Data

Feb. 9, 2018   (DE) .......... 10 2018 102 917

(51) Int. Cl.
| | |
|---|---|
| G06K 7/10 | (2006.01) |
| H04N 5/232 | (2006.01) |
| H04N 5/225 | (2006.01) |
| G03B 3/00 | (2006.01) |
| G02B 7/04 | (2006.01) |
| G03B 17/12 | (2006.01) |
| G06K 7/14 | (2006.01) |
| G03B 13/32 | (2006.01) |

(52) U.S. Cl.
CPC .......... *G06K 7/10722* (2013.01); *G02B 7/04* (2013.01); *G03B 3/00* (2013.01); *G03B 17/12* (2013.01); *G06K 7/10811* (2013.01); *G06K 7/1413* (2013.01); *G06K 7/1417* (2013.01); *H04N 5/225* (2013.01); *H04N 5/2252* (2013.01); *H04N 5/2254* (2013.01); *H04N 5/232121* (2018.08); *G03B 13/32* (2013.01)

(58) Field of Classification Search
CPC ... G06K 7/10722; G06K 7/14; G06K 7/10851
USPC .................................................. 235/462.11
See application file for complete search history.

(56) References Cited

U.S. PATENT DOCUMENTS

| | | | | |
|---|---|---|---|---|
| 5,920,061 A | * | 7/1999 | Feng ............... | G06K 7/10722 235/462.42 |
| 7,389,926 B2 | * | 6/2008 | Aoki ............... | G06K 7/10722 235/400 |

(Continued)

FOREIGN PATENT DOCUMENTS

| | | |
|---|---|---|
| EP | 2026249 A1 | 2/2009 |
| EP | 2498113 A1 | 9/2012 |

(Continued)

OTHER PUBLICATIONS

German Office Action dated Oct. 4, 2018 corresponding to application No. 102018102917.9.

*Primary Examiner* — Ahshik Kim
(74) *Attorney, Agent, or Firm* — Nath, Goldberg & Meyer; Jerald L. Meyer

(57) ABSTRACT

A camera is provided that comprises an image sensor for detecting image data from a detection region and a reception optics arranged in front of the image sensor, a focus adjustment unit having a thread for changing the position of focus of the reception optics by way of a rotary movement and a front screen. In this connection the reception optics has a front region having an inner contour that is accessible via the front screen in order to rotate the reception optics from the outside in the thread and to thus adjust the focus.

16 Claims, 3 Drawing Sheets

(56) References Cited

U.S. PATENT DOCUMENTS

| | | | |
|---|---|---|---|
| 9,591,299 B2 | 3/2017 | Hess, Jr. et al. | |
| 2006/0256209 A1 | 11/2006 | Yoshida et al. | |
| 2009/0086312 A1 | 4/2009 | Chou | |
| 2010/0176319 A1 | 7/2010 | Nunnink et al. | |
| 2012/0014688 A1 | 1/2012 | Ma | |
| 2012/0261472 A1* | 10/2012 | Nubling | G06K 7/10722 235/454 |
| 2013/0129335 A1 | 5/2013 | Gainer | |
| 2014/0267869 A1 | 9/2014 | Sawa | |
| 2015/0103223 A1 | 4/2015 | Park | |
| 2019/0170994 A1* | 6/2019 | Li | G02B 21/361 |

FOREIGN PATENT DOCUMENTS

| | | |
|---|---|---|
| JP | 2006-317191 A | 11/2006 |
| JP | 2008-152035 A | 7/2008 |
| JP | 2009-43260 A | 2/2009 |
| JP | 2010-500626 A | 1/2010 |
| JP | 2014-178643 A | 9/2014 |
| JP | 2015-23412 A | 2/2015 |
| WO | 2008020890 A1 | 2/2008 |

\* cited by examiner

CAMERA AND METHOD FOR FOCUS ADJUSTMENT

BACKGROUND

1. Field

The invention relates to a camera that has an image sensor for detecting image data from a detection region, has a reception optics arranged in front of the image sensor, has a focus adjustment unit having a thread for changing the position of focus of the reception optics by way of a rotary movement and a front screen. The invention further relates to a method for the focus adjustment a camera having an image sensor and a front screen, wherein the position of focus of a reception optics arranged in front of the image sensor is changed by a rotary movement in a thread.

2. Description of the Related Art

In industrial applications, cameras are used in a multitude of ways in order to automatically detect object properties, for example for the inspection or measurement of objects. In this connection images of the object are recorded and are evaluated in accordance with the task by means of image processing methods. A further application of cameras is the reading of codes. With the aid of an image sensor, objects with codes present thereon are recorded. Code regions are identified in the images and are then decoded. Camera-based code readers also manage to cope with other kinds of code types that differ from one-dimensional bar codes without any problems, that are assembled like a matrix code and also in two dimensions and that make available more information. Also, the automatic text recognition of printed addresses (OCR, Optical Character Recognition) or of handwriting is in principle a reading of codes. Typical fields of applications of code readers are supermarket cash desks, automatic package identification, sorting of postal transmissions, the luggage handling in airports and other logistical applications.

A frequent situation of detection is the assembly of the camera above a conveyor belt. The camera records images during the relative movement of the flow of objects on the conveyor belt and in dependence on the obtained object properties initiates further processing steps. Such processing steps, for example, consist in the further processing at a machine adapted to the specific object, the machine influencing the conveyed object, or in a change of the flow of objects in which certain objects are excluded from the flow of objects in the framework of a quality control or the flow of objects is sorted into a plurality of partial flow of objects. When the camera is a camera-based code reader, the objects are identified for a correct sorting or for similar processing steps by means of the attached codes.

In order to detect the structures at different spacings and to read the codes the position of focus of the camera has to be set or expressed colloquially has to be focused. For this purpose, different technologies exist. Typically, the position of the lens system is changed, this means the spacing between the lens system and the image sensor, in order to achieve a refocusing. This frequently also takes place automatically, for example with the aid of a step motor. Specifically, for simpler cameras or such in which the focus position has to remain constant over longer periods of operation it is, however, also in no way untypical to provide a manual focus adjustment.

The EP 2 498 113 A1 suggests a focus adjustment with the aid of a motor-driven cam disk and a parallel guidance of the lens system. The cam disk can in principle also be rotated by hand. The parallel guidance is however demanding in effort and cost and moreover also requires more construction space.

Alternatively, it is known to adjust the position of focus by a rotary movement in a thread. In this way the space required is optimized, however, different problems result. In order to maintain a protective class, such as IP54, IP65 or IP67, a protective cover or a housing front screen has to be present above the lens system. However, the protective cover then has to be removed in order to be able to rotate the lens system for each refocusing process. Moreover, the visualization of the position of focus is difficult for a thread. Specific markings can indeed be attached at the lens system. However, for longer focal range lens systems having a larger focus adjustment range, a larger lens system stroke is required and several thread turns are required for this purpose. This ambiguity can only be visualized at the lens system with large difficulties and in no way on use of simple markings in a directly detectable manner.

From the U.S. Pat. No. 9,591,299 B2 a monitoring camera having a manually adjustable focus is known. A tool engages from the outside onto a non-closer described indirect adjustment mechanism for setting the focus position.

In the US 2015/0103223 A1 a camera having a live image display is described. In a graphical user interface for the manual focus adjustment, a target focus calculated from a measurement and an actually set focus are displayed. The actual adjustment movement in this way takes place completely conventionally by means of an adjustment focus ring or a button. Such a concept is not suitable for simple cameras due to the display for the live image. Moreover, a certain protective class would only be maintained with additional non-explained sealing measures, such as for example a protective cover that has to be removed for each refocusing.

SUMMARY

For this reason, it is an object of the invention to provide an improved focus adjustment for a camera.

This object is satisfied by a camera and by a method for the focus adjustment in accordance with the respective independent claim. The camera comprises an image sensor having a reception optics. The focus of which can be set via a threaded mechanism in that a rotary movement of the reception optics changes the spacing to the image sensor. A front screen closes the camera respectively its housing at the front side, this means in the viewing direction of the camera and thereby protects, for example, an illumination unit of the camera whose light illuminates the detection region through the front disk.

The invention now starts from the basic idea of quasi rotating the reception optics through the front screen and in this way manually being able to adjust the focus. For this purpose, the reception optics is provided with an inner contour in its front or rear region. Thus, a matching tool can engage the inner contour from the outside and the reception optics can be rotated with the tool in the thread.

The invention has the advantage that the focus adjustment based on a thread is very simple and remains space saving and, in this way, a miniaturized camera can arise. Components demanding in effort and cost, such as a display for a live image, are in this way not required. The adjustment via an inner contour at the reception optics without an opening of the front screen enables the maintenance of a protective apparatus class, such as IP54, IP65 or IP67 and still permits a continuously accessible, fast and simple refocusing. Moreover, the assembly ensures for an integrated optical channel separation, in which the reception path is protected from optical cross-talk of an own active illumination of the camera.

The front screen preferably has an opening in such a way that the inner contour is freely accessible from the outside. This has several advantages. On the one hand, the inner contour constantly remains open for the tool. It is therefore not required to open the front screen prior to each refocusing, to remove a lens system protective cover or the like. Moreover, a cost-effective front screen can be used that is, for example, produced from a plastic having low requirements with regard to the optical properties, as the passage region of the received light remains hollow with respect to the reception optics where significantly higher optical demands arise.

The reception optics is preferably arranged in a sealing manner in the opening. For this purpose, for example a sealing ring serves at the outer perimeter of the reception optics with regard to the front screen. This is a possible measure in order to maintain a desired protective class albeit having an opening in the front screen and the constant accessibility of the inner contour from the outside.

The reception optics preferably has a protective element between the inner contour and the optical elements. The protective element, preferably a protective glass or a corresponding plastic element, terminates the inner space of the camera that in this way maintains a pre-determined protective class in a simple manner. The inner contour for adjusting the focus position lies outside and in this way is freely accessible, whereas the actual reception optics remains protected, this means its optical elements, such as lenses and the like. The protective element can have a high optical quality and also remains at its position during a focus adjustment.

The camera preferably has a focus position measurement unit for determining the actual position of the reception optics. The focus position measurement unit delivers a measurement value for the actual position of the reception optics. The actually interesting measurement value is the spacing between the reception optics and the image sensor, this means the actual focus position. For this purpose, the rotary position of the reception optics in the thread, preferably on consideration of a plurality of complete terms or an equivalent direct displacement along the optical axis of the measurement optics can be measured.

The focus position measurement unit preferably has a magnetic element, preferably a magnetic strip and a Hall sensor. The magnetic element also carries out the to and fro movement of the reception optics on focus adjustment, the Hall sensor does not. The relative movement can also be created by a vice versa arrangement, but then a moveable Hall sensor has to be supplied and controlled. The Hall sensor is preferably a highly integrated component including electronics that directly outputs position values.

The focus position unit preferably has a sliding element having the magnetic element, with the sliding element being arranged at the perimeter of the reception optics and being axially pressed from behind with a spring force towards the reception optics. The reception optics preferably has a larger radius in its front region so that a kind of rear wall arises to which the sliding element can be pressed from the inside. The spring-loaded and guided sliding element ensures that the reception optics entrains the magnetic element on adjustment movements in both directions if possible, without a slippage.

The camera preferably has a distance measurement unit for determining the distance to an object to be recorded. From the measurement values of the distance measurement unit, a required focus position is determined with which the reception optics is focused strongly onto the object to be recorded.

The distance measurement unit preferably has a light transmitter, a light receiver and a time of flight of light measurement unit for determining the time of flight of light of a light signal transmitted and received again. In this way the spacing is determined by a time of flight of light measurement method, in particular a pulsed method, a pulse averaging method or a phase method. The distance measurement unit is preferably highly integrated and directly outputs distance values.

The camera preferably comprises a first display unit for a display of a required focus position and/or has a second display unit for a display of an actual position of the reception optics. Thus, the actual and/or the required focus position is visualized. Preferably the respective measurement values of the distance measurement unit and the focus measurement position unit are indicated. The measurement values must possibly still be recalculated and rescaled linearly or non-linearly. Rather than the display of measurement values it is principally also plausible to display work settings or parameters of certain operating modes.

The first display unit and/or the second display unit preferably have a light strip. An arrangement is understood as a light strip that is illuminated at several positions, with the respective position visualizing different increasing values of a scalable measurement size, here the focus position. An example of implementation is a series arrangement of light sources, in particular LEDs, that respectively lights up at that position that represents most closely the measurement value. Equivalent light patterns are also plausible, for example an illumination matching the position up to the measurement value, from this position or everywhere and precisely not at this position. By way of the light strip, a simple display arises that nevertheless permits an intuitive recognition straight away of a plurality of focus positions and in this way permits a very simple and fast taking into operation or adaptation of the camera. In contrast to markings at a thread there is also no ambivalence when the reception optics requires more than one complete turn of the lens system for the focus region to be covered. The demand in effort and cost for an image display of a live image including a user interface can thereby be omitted.

The first display unit and the second display unit are preferably arranged in mutual neighborhood with comparable scaling. Thereby, a still present discrepancy between required and actual focus position can be detected immediately by the user. The correct focus position is then set very simply by a rotation of the reception optics with a tool in its inner contour up until both displays conform to one another. Preferably, the two display units are identical light strips arranged amongst one another that possibly differentiate from one another in their color. However, in principle also the position of the light strips codes whether these are responsible for the required or the actual focus position, rather than displaying this via the color of the light strip this can be displayed by a designation. However, it is also plausible that a single light strip forms both display units. Then the focus position is adjusted for so long up until a then conforming position together displays the actual and the required focus position. Slightly more comfortable than this is a display with multi-colored LEDs, for example red for the actual focus position, blue for the required focus position and possibly also green for a conformity, is plausible.

A scale preferably shows units for the focus positions illustrated by the first display unit and/or the second display unit. In this way, not only nearly relative focus positions but also absolute focus positions can be read out. Preferably only one scale is present for both display units that then works with the same units for a direct comparison. In particular a fixed indication for the scale is sufficient which associates a unit with the position of a light strip.

The camera preferably has a control and evaluation unit that is configured to identify image data in the code regions and to read out their code content. In this way the camera becomes a camera-based code reader for bar codes and/or two-dimensional codes in accordance with certain standards, possibly also for an optical character reading (OCR). Other than that a control and evaluation unit is preferably also provided without code reading functionality. The control and evaluation unit controls and executes the diverse tasks in the camera, such as image recording, an illumination, the measurement of actual and required focus position and their display.

The method in accordance with the invention can be further developed in a similar manner and in this way shows similar advantages. Such advantageous features are described by way of example but not conclusively in the dependent claims dependent on the independent claims.

Preferably a required focus position is indicated as a spacing to an object to be recorded and an actual focus position are measured and displayed as a position of the reception optics and the actual focus position is changed by rotating the reception optics in the thread up until the actual focus position and the required focus position conform to one another. This can be recognized in a particularly simple manner when both displays are carried out via light strips that are then brought into conformity by rotation of the reception optics. In this way a reliable, user-friendly manual focus adjustment takes place in which the camera does not have to be opened and for this reason maintains a device protective class with simple means.

BRIEF DESCRIPTION OF THE DRAWINGS

The invention will also be described in the following with regard to further features and advantages purely by way of example by means of embodiments and with reference to the submitted drawing in detail. The illustrations in the drawing shown in.

DETAILED DESCRIPTION OF THE PREFERRED EMBODIMENTS

Figure 1:
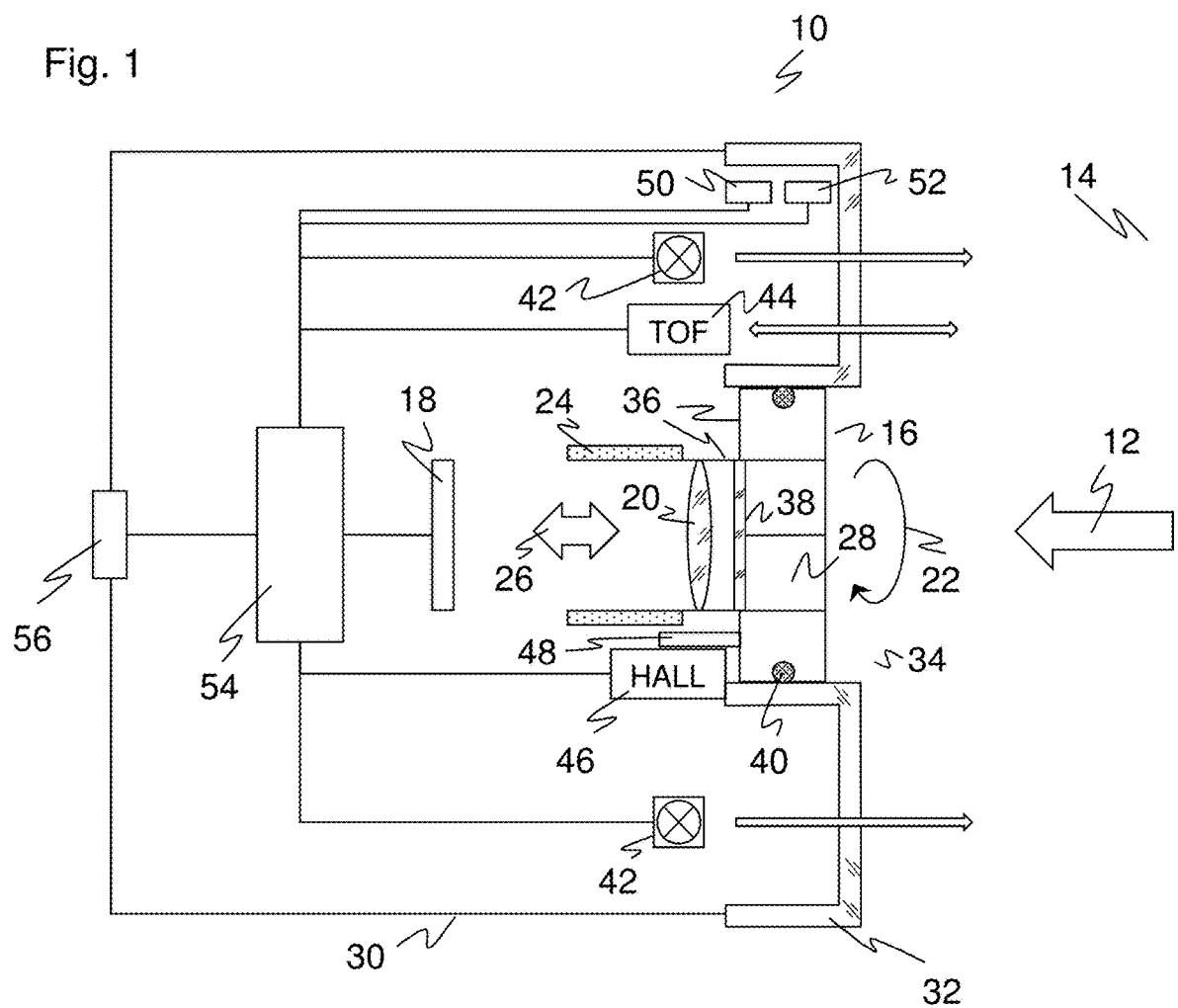
FIG. 1 a schematic sectional illustration of a camera with focus adjustment from above.

FIG. 1 shows a schematic sectional illustration of a camera 10. Received light 12 from a detection region 14 is incident on a reception optics 16 that guides the received light 12 to an image sensor 18. The optical elements of the reception optics 16 are preferably a lens system formed from a plurality of lenses and other optical elements, such as apertures, prisms and the like, but are represented here for reasons of simplification only by a lens 20.

The camera 10 has a manual focus adjustment. As indicated by a first arrow 22 the reception optics 16 is rotationally movable by way of a thread 24 only represented schematically and can be displaced to and fro along its optical axis in accordance with a second arrow 26. The spacing thereby changed between the reception optics 16 and the image sensor 18 brings about a focus adjustment.

Figure 2:
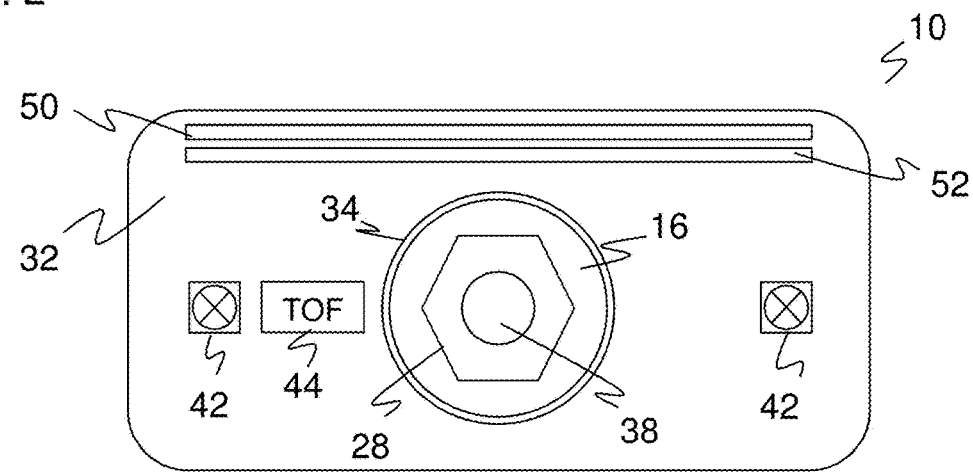
FIG. 2 a front view of the camera.
Figure 3:
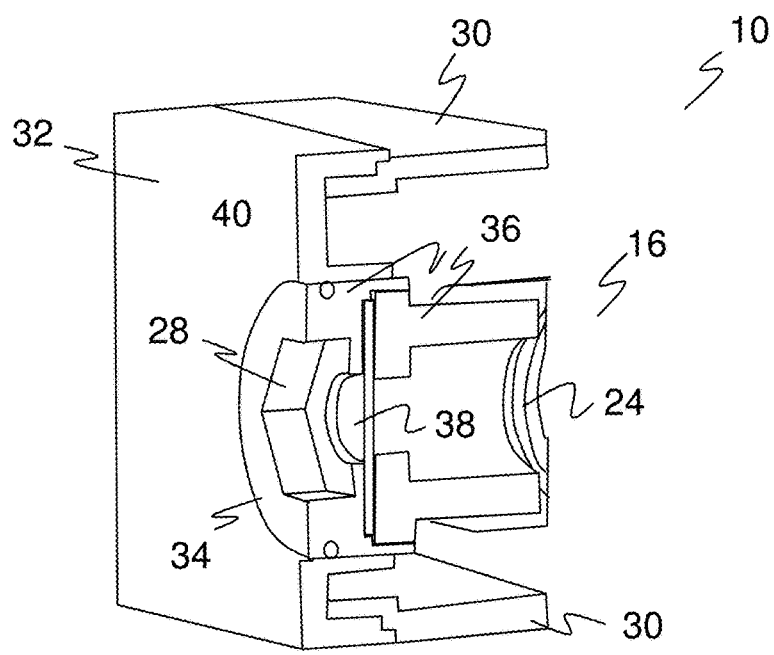
FIG. 3 a three-dimensional sectional view of the camera from the side.

In order to rotate the reception optics 16 an inner contour 28 is provided in its outer or inner region. This inner contour 28 can be recognized in an improved manner in a front view in accordance with FIG. 2 or a lateral three-dimensional sectional view in accordance with FIG. 3 to which reference will be made in the following with regard to further features of the camera 10.

In the illustrated embodiment the inner contour 28 is a hexagon socket, where the engagement by means of a matching tool permits a rotary movement without the particular application of force. The invention is, however, not limited to this. Initially also other contours having an arbitrary different number rather than six edges are plausible, furthermore a crossed slit, a star or a different pattern. The contour could also match a coin or a different standardized almost always available object. The edge of a credit card could, for example, be used like a straight headed screwdriver. A reliable engagement is important for transferring a sufficient torque with which the reception optics 16 can be brought into a desired rotary position. For this reason, a complex contour is preferred over only a slot. As a further alternative, it is also plausible to let the reception optics 16 also project outwardly slightly from the camera 10 in contrast to what is shown in FIG. 1 and to provide a contour, for example for the engagement of a credit card placed in a planar manner at its outer perimeter.

The camera 10 is protected by a housing 30 that is terminated in its front region where the received light 12 is incident by means of a front screen 32. The front screen 32 in turn has an opening 34 with which the reception optics 16 is closed. The front screen 32 is configured in such a way in this embodiment in the region of the opening 34 that the reception optics 16 remains in contact with the front screen 32 also on the focus adjustment and does not project out of the camera 10.

The outer perimeter of the reception optics 16 is configured as a kind of sleeve 36 that has a protective glass 38 as a separation between the inner and the outer which protects the lens 20 on the inside and leaves the inner contour 28 open to the outside and in this way accessible. A sealing ring 40 is arranged between the front screen 32 and the sleeve 36 that also aids in maintaining the reception optics 16 in its position.

With the aid of the housing 30 and the front screen 32, as well as preferably the protective glass 38 and the sealing ring 40 the camera 10 achieves a desired protective class such as IP54, IP65 or IP67. Since the inner contour 28 is present outside of the protected inner space a refocusing has no impact on the protective class and no further steps are required to then restore the protective class, such as, for example the opening of the housing 30, the front screen 32 or a protective cover of the reception optics 16.

The camera 10 in the embodiment of FIG. 1 also comprises further optional features. An illumination unit 42 represented by way of example by means of two light sources during the respective image recording ensures for sufficient light conditions in the detection region 14. The light of the illumination unit 42 arrives at the outside via the front screen 32. The shown assembly with the reception optics 16 stored in the thread 24 having the sleeve 36 has the advantage that no additional channel separation between transmitted light and reception optics has to be installed. The sleeve 36 itself serves as a channel separation.

A distance sensor 44 designated with TOF (Time Of Flight) is in a position to measure the distance to an object in the detection region 14. From this distance a respective needed or required focus position can be determined. The distance sensor 44 works with a time of flight of light method, in which a light signal is transmitted is reflected at the object and is received again. The time of flight of light is a direct measure for the spacing due to the constant speed of light. Preferably, a highly integrated component with light transmitters, light transceivers and required control evaluation is used as a distance sensor 44 that directly outputs distance values. However, also other components and measurement principles exist in order to measure the object spacing for a required focus position.

A focus position sensor 46 designated with HALL in cooperation with a magnetic element 48 that is entrained at the reception optics 16 measures the actual position along its optical axis and in this way the mutual actual focus position. This will be explained in more detail in the following with reference to the FIGS. 4 and 5.

A first display unit 50 and a second display unit 52 show the user the required focus position and the actual focus position. Position and shape of the display units 50, 52 in FIG. 1 are purely schematic and by way of example. The display of focus positions will be described in detail with reference to the FIG. 6.

A control and evaluation unit 54 is connected to the mentioned electronic components and is responsible for the control, evaluation and other coordinating tasks in the camera 10. It thus reads out image data of the image sensor 18 in order to process this and to output this to an interface 56. Also, own evaluations of the image data are plausible, in particular the decoding of code regions in the image data, with which the camera 10 becomes a camera-based code reader. The control and evaluation unit 54 moreover receives the measurement values from the distance sensor 44 and the focus position sensor 46 and derived from this, displays required and actual focus positions at the display units 50, 52. It is plausible that the distance sensor 44 and the focus position sensor 46 are not highly integrated and only deliver raw measurement signals that are then further processed in the control and evaluation unit 54.

Figure 4:
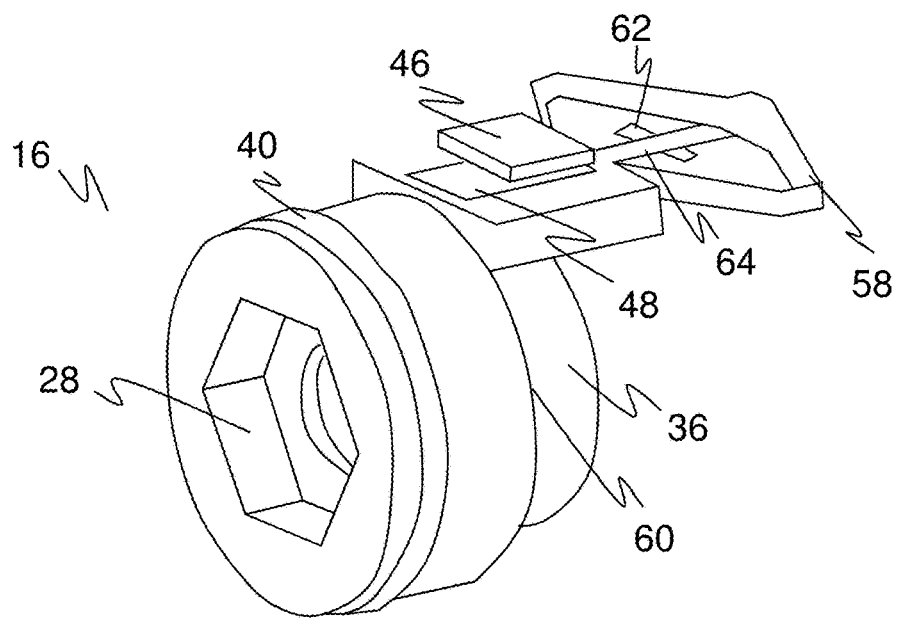
FIG. 4 a three-dimensional view of a reception optics with a focus position measurement unit.

FIG. 4 shows a three-dimensional view of the reception optics 16 for explaining an embodiment of the focus position sensor 46. The focus position sensor 46 is a Hall sensor, preferably a highly integrated sensor on a circuit board, that directly outputs position values. The control and evaluation unit 54 is in a position to translate such position values which initially only indicate the position of the reception optics 16 in the units made available by the Hall sensor, into a focus position, for example by corresponding measurements in the production process, a calculation prescription or a lookup table. The invention is not purely limited to a Hall sensor, but also comprises other detection principles different from the linear position determination.

The turning in and turning out of the reception optics 16 during a refocusing in this way brings about a displacement of the magnetic element 48 entrained with the reception optics beneath the focus position sensor 46. For this purpose, a magnetic element 48 configured as a magnetic strip in this example is arranged in a slider 58. The slider 58 is pressed in a guide 60 by way of a non-illustrated spring from behind towards a step 62 in the sleeve 36 of the reception optics 16. The slider 58 including its guiding rod 64 for the guidance 60 and spring structure can be made available in a plastic injection molded part.

Figure 5:
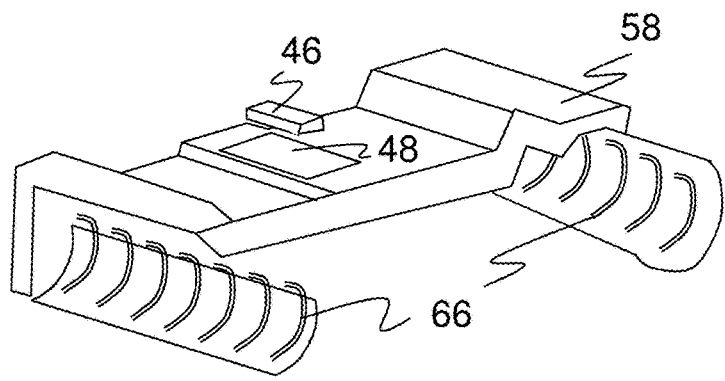
FIG. 5 a three-dimensional view of an alternative focus position measurement unit.

FIG. 5 shows a further embodiment of the slider 58 by means of which the magnetic element 48 can be moved together with the reception optics 16. This slider 58 has a different shape in order to illustrate that the invention is not limited to a specific shape. Moreover, the springs 66 are shown with which the slider 58 is pressed from behind towards the sleeve 36. These are preferably formed as separated spiral springs and are not over-molded with the slider 58 in a single part.

In further embodiments the slider 58 does not engage from behind at the step 62, but uses an alternative working point, for example a groove in the reception optics 16 or the sleeve 36.

Figure 6:
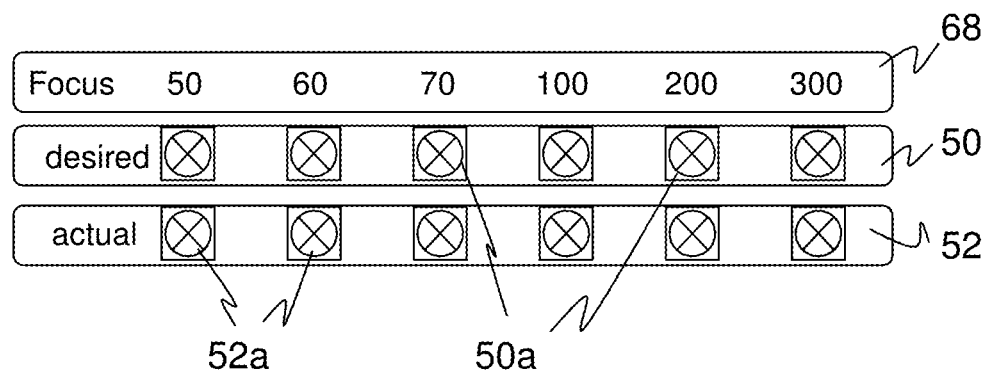
FIG. 6 a schematic illustration of a display for measured and required focus position.

FIG. 6 schematically shows a possible embodiment of the display units 50, 52 for visualizing the focus position. The first display unit 50 is responsible for the measurement value of the distance sensor 44 and in this way the desired value of a required focus position, the second display unit 52 is responsible for the measurement value of the focus position sensor 46 and in this way for the actual value of an actually set focus position of the reception optics 16. An optional scale 68 complements the units of the illustrated focus positions. This is non-linear in this example and could alternatively also be finer, coarser and also linear.

The display units 50, 52 in this case are configured as light strips in the form of a series arrangement of a plurality of light sources 50a, 52a, in particular as rows of LEDs. Always that light source 50a, 52a is illuminated that corresponds most closely to the displayed focus position. Intermediate positions could also be made visible by the illumination of two adjacent light sources 50a, 52a. It is also plausible to provide a further non-illustrated light source that then illuminates when actual focus position and required focus position are brought into exact conformity, wherein a tolerance which is still acceptable for this purpose is predefined. For an even more improved differentiability the display units 50, 52 could use different colors. The display units 50, 52 could be visible as shown in FIG. 1 through the front screen 32 in the upper region. Alternatively, however also each other position is possible.

With the aid of the display units 50, 52 the camera 10 can be focused as follows: The object to be recorded is present at a corresponding spacing from the camera 10 in the detection region 14. In a first step distance measurement of the distance sensors 44 is activated for a certain period of time, be it by the control and evaluation unit 54 or by pressing of a button of a non-illustrated button of the camera 10. The measured distance value is recalculated to a unit matching the scale 68 and the corresponding light source 50a of the first display unit is activated. It then illuminates for example in blue and thus indicates the required focus position.

In an analog manner that light source 52a lights up on the second display unit 52, for example in red, that corresponds to the actual focus position of the reception optics 16 measured by the focus position sensor 46. In the second step the user now sets the actual focus position to the required focus position by rotating the reception optics 16 by way of a tool engaging the inner contour 28. For this purpose, merely the reception optics 16 has to be turned for so long up until the red light moving during the rotation on the second display unit 52 moves to align with the blue light on the first display unit 50. Insofar as an additional light source for displaying an exact conformity within a specific tolerance of actual focus position and required focus position is present one can turn for so long at the reception optics 16 up until this light source lights up, with the display units 50 providing a very good orientation of how one still has to correct for this.

In a further non-shown embodiment, the two display units 50, 52 are combined in a single light strip or row of LEDs. Those light sources 50a, 52a then light up at two different positions for so long until the required and the actual focus position are still not conform to one another. With the aid of multi-colored LEDS one can thus directly differentiate between the values which are respectively required.

Figure 7:
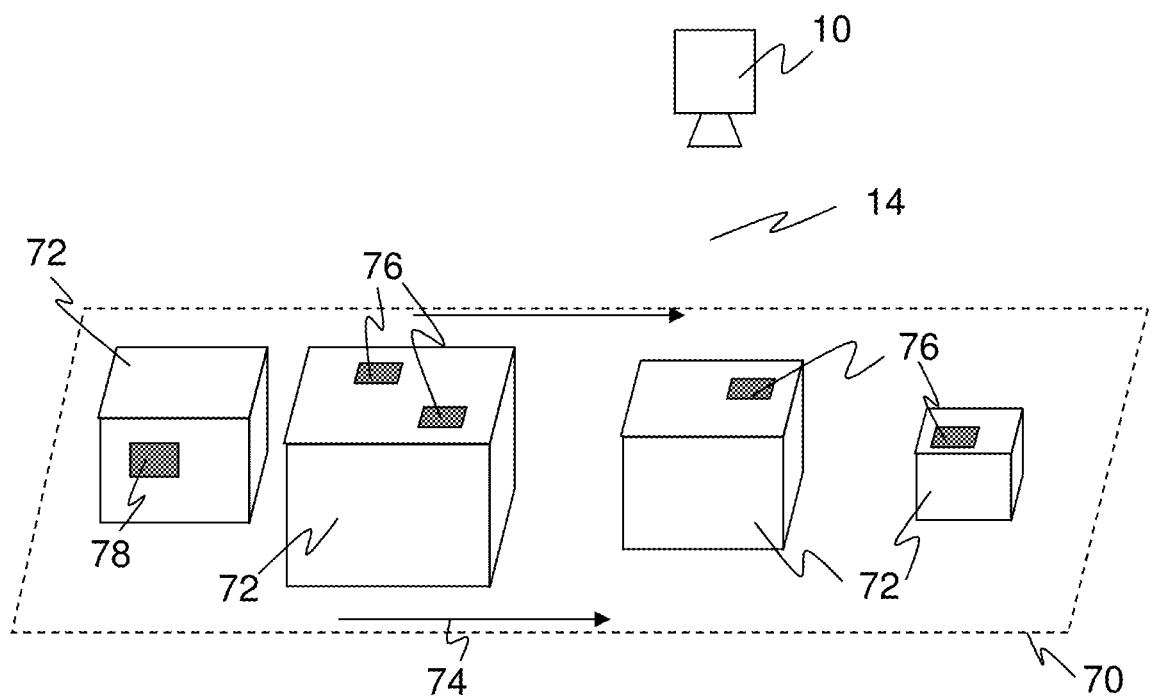
FIG. 7 a three-dimensional view of an exemplary application of a camera in assembly at a conveyor belt.

FIG. 7 shows a possible application of the camera 10 in an assembly at a conveyor belt 70 which, as indicated by the arrow 74, conveys objects 72 through the detection region 14 of the camera 10. The objects can bear code regions 76 at their outer surfaces. The task of the camera 10 is to detect the properties of the object 72 and to recognize, in a preferred use as a code reader, the code regions 76, to read the attached codes, to decode these and to associate these with the respective object 72. In order to also detect laterally attached code regions 78, preferably additionally non-illustrated cameras are used from different perspectives.

The invention claimed is:

1. A camera, comprising:
   an image sensor for detecting image data from a detection region;
   reception optics arranged in front of the image sensor to focus received light onto the image sensor;
   a focus adjustment unit having a thread for changing the position of focus of the reception optics by way of a rotary movement; and
   a front screen,
   wherein the reception optics have a front region having an inner contour, the front region being accessible through the front screen in order to rotate the reception optics from an external position spaced apart from the thread to adjust the focus.

2. The camera in accordance with claim 1,
   wherein the front screen has an opening in such a way that the inner contour is freely accessible from the outside.

3. The camera in accordance with claim 1,
   wherein the reception optics is arranged in a sealing manner in the opening.

4. The camera in accordance with claim 1,
   wherein the reception optics has a protective element between the inner contour and optical elements.

5. The camera in accordance with claim 1,
   further comprising a focus position measurement unit for determining an actual position of the reception optics.

6. The camera in accordance with claim 5,
   wherein the focus position measurement unit has a magnetic element and a hall sensor.

7. The camera in accordance with claim 6,
   wherein the focus position measurement unit has a sliding element having the magnetic element, the sliding element being arranged at the perimeter of the reception optics and being pressed axially from behind with a spring force towards the reception optics.

8. The camera in accordance with claim 1,
   further comprising a distance measurement unit for determining the distance to an object to be recorded.

9. The camera in accordance with claim 8,
   wherein the distance measurement unit has a light transmitter, a light receiver and a time of flight of light measurement unit for determining a time of flight of light of a light signal that is transmitted and received again.

10. The camera in accordance with claim 1,
    further comprising a first display unit for a display of a required focus position and/or has a second display unit for a display of an actual position of the reception optics.

11. The camera in accordance with claim 10,
    wherein at least one of the first display unit and the second display unit has a light strip.

12. The camera in accordance with claim 11,
    wherein the light strip is a series arrangement of light sources.

13. The camera in accordance with claim 10,
    wherein the first display unit and the second display unit are arranged in mutual neighborhood with comparable scaling.

14. The camera in accordance with claim 1,
    further comprising a control and evaluation unit that is configured to identify code regions in the image data and to read out their code content.

15. A method for the focus adjustment of a camera having an image sensor and a front screen, wherein the position of focus of reception optics arranged in front of the image sensor is changed by a rotary movement in a thread, in which method the rotary movement is generated from an external position spaced apart from the thread, such that a tool engages in an inner contour at a front region of the reception optics from the outside through an opening of the front screen and the reception optics is thus turned in the thread, wherein the reception optics focus received light onto the image sensor.

16. The method in accordance with claim 15,
    wherein a required focus position is measured as a spacing to an object to be recorded and an actual focus position is measured as a position of the reception optics and the actual focus position is changed by a rotation of the reception optics in the thread up until the actual focus position and the required focus position correspond to one another.

* * * * *